United States Patent
Nitzpon et al.

(10) Patent No.: US 8,345,709 B2
(45) Date of Patent: Jan. 1, 2013

(54) BIT STREAM CONVERSION SYSTEM

(75) Inventors: Hans-Juergen Nitzpon, Waldbronn (DE); Jochen Klaus-Wagenbrenner, Gaggenau (DE); Detlef Teichner, Koeningsfeld (DE)

(73) Assignee: Harman International Industries, Incorporated, Northridge, CA (US)

( * ) Notice: Subject to any disclaimer, the term of this patent is extended or adjusted under 35 U.S.C. 154(b) by 1434 days.

(21) Appl. No.: 10/479,885

(22) PCT Filed: Jun. 16, 2002

(86) PCT No.: PCT/US02/19160
§ 371 (c)(1),
(2), (4) Date: Jul. 26, 2004

(87) PCT Pub. No.: WO02/103999
PCT Pub. Date: Dec. 27, 2002

(65) Prior Publication Data
US 2004/0252036 A1    Dec. 16, 2004

(30) Foreign Application Priority Data

Jun. 16, 2001  (DE) .................................. 101 29 108

(51) Int. Cl.
*H04J 3/16* (2006.01)
*H04J 3/22* (2006.01)
*H04J 3/00* (2006.01)
H04L 12/28 (2006.01)
H04L 12/56 (2006.01)

(52) U.S. Cl. ........................................ 370/466; 370/476
(58) Field of Classification Search .................. 370/466, 370/395.64
See application file for complete search history.

(56) References Cited

U.S. PATENT DOCUMENTS

| | | | | |
|---|---|---|---|---|
| 5,323,396 | A * | 6/1994 | Lokhoff | 370/468 |
| 5,617,419 | A * | 4/1997 | Christensen et al. | 370/471 |
| 5,802,068 | A * | 9/1998 | Kudo | 370/538 |
| 5,878,045 | A * | 3/1999 | Timbs | 370/466 |
| 6,047,007 | A * | 4/2000 | Munday et al. | 370/545 |
| 6,076,062 | A * | 6/2000 | Van Steenbrugge | 704/500 |
| 6,172,626 | B1 | 1/2001 | McDonnell et al. | 341/67 |
| 6,205,223 | B1 * | 3/2001 | Rao et al. | 380/42 |
| 6,256,612 | B1 * | 7/2001 | Vo et al. | 704/500 |
| 6,262,990 | B1 | 7/2001 | Ejiri | 370/412 |
| 6,263,019 | B1 | 7/2001 | Ryan | 375/240.02 |
| 6,421,695 | B1 | 7/2002 | Bae et al. | 708/402 |
| 6,636,531 | B1 * | 10/2003 | Nakashima et al. | 370/505 |
| 6,654,383 | B2 * | 11/2003 | Haymes et al. | 370/466 |

(Continued)

FOREIGN PATENT DOCUMENTS

JP    07-050645    2/1995
(Continued)

OTHER PUBLICATIONS

Author Unspecified, Digital Audio Compression Standard, Advanced Television Systems Committee, Version A/52, Released Dec. 20, 1995, pp. 115-126.*

*Primary Examiner* — Faruk Hamza
*Assistant Examiner* — Christopher Crutchfield
(74) *Attorney, Agent, or Firm* — O'Shea Getz P.C.

(57) ABSTRACT

A bit-stream converter capable of converting a first synchronous compressed bit-stream of data at a first sampling rate to second synchronous compressed bit-stream frame of data at a second sampling rate is disclosed. The bit-stream converter architecture may include a payload length detector and a zero stuffing unit in signal communication with the payload length detector. The zero stuffing unit is capable of zero stuffing section responsive to the payload length detector detecting the payload length.

16 Claims, 6 Drawing Sheets

U.S. PATENT DOCUMENTS

| | | | |
|---|---|---|---|
| 6,657,996 B1 * | 12/2003 | Mladenovic et al. | 370/356 |
| 2006/0069550 A1 * | 3/2006 | Todd et al. | 704/212 |

FOREIGN PATENT DOCUMENTS

| | | |
|---|---|---|
| JP | 09-312065 | 12/1997 |
| JP | 11-018054 A | 1/1999 |
| JP | 11-177581 A | 7/1999 |
| JP | 2001-094448 A | 4/2001 |
| JP | 2002-077128 A | 3/2002 |
| JP | 2002-297193 A | 10/2002 |
| JP | 2001-125596 | 5/2011 |
| WO | WO0189119 A3 | 11/2001 |

* cited by examiner

BIT STREAM CONVERSION SYSTEM

FIELD OF THE INVENTION

This invention relates generally to the field of data communications. In particular, the invention relates to data communication systems that utilize compressed bit-streams.

RELATED ART

The complexity of consumer video and audio electronics component systems is increasing at rapid pace. Systems such as compact disk ("CD"), laserdisc, digital video disc or digital versatile disc ("DVD"), mini-disk, and others are now common. As a result, a modern trend is to integrate all these systems into home theater and automotive entertainment systems.

Generally, current CD and DVD chipsets provide a Sony/Philips Digital Interface ("S/PDIF") that outputs audio in bit-streams of data according to the ISO/IEC 60958 (i.e., linear pulse code modulation ("PCM")) and ISO/IEC 61937 (i.e., non-linear PCM) standards. Typically, compressed multi-channel audio bit-streams, such as Dolby Digital® (AC-3), DTS®, MLP®, MP3®, MPEG II®, MPEG II-AAC® etc. are formatted according to ISO/IEC 61937 and are conveyed over S/PDIF to an external audio decoder. The bit-streams of data are bi-phased coded with a symbol frequency of 64 times (for very low bit-rates 128 times) the original sampling-rate ("$f_{sample}$"). A S/PDIF receiver typically locks on the bit-stream and synchronously generates the $f_{sample}$ for decoding the bit-stream of data. The sampling frequency of the original bit-stream may cover the range of 8-192 kHz (e.g., CD are typically 44.1 kHz, DVD-V typically 48 kHz, DVD-A typically 96 kHz, etc.).

Multimedia networks may be utilized to integrate CD and DVD type components into modern home theater and automotive entertainment systems. Unfortunately, many multimedia networks operate in a synchronous manner at a constant rate of e.g. 44.1kHz that is different than the encoded audio source. In order to transport digital audio from a digital source (such as a CD or DVD) to a destination (such as a decoding amplifier) over the synchronous channels, the audio sampling rate (e.g. 48 kHz for a DVD) needs to be adapted to the multimedia network sampling rate (44.1 kHz). A previous approach to adapt the two sampling rates includes sample rate converting the audio. However, since compressed multi-channel audio is a bit-stream rather than pulse code modulation ("PCM") samples, this approach cannot be applied immediately. The audio needs to be decoded first into typically 5.1 PCM channels and then sample rate conversion may be applied prior to sending it over multimedia network. Decoded audio, however, occupies much more bandwidth than the compressed bit-stream. Therefore, there is a need for a system that is capable of adapting the two sampling rates.

SUMMARY

This invention provides a bit-stream converter capable of converting a first synchronous compressed bit-stream frame of data at a first sampling rate to a second synchronous compressed bit-stream frame of data at a second sampling rate. Such a bit-stream converter may utilize a system architecture that performs a process for converting a first synchronous compressed bit-stream frame of data at a first sampling rate to a second synchronous compressed bit-stream frame of data at a second sampling rate. The process may include determining a format for the first compressed bit-stream frame. The first compressed bit-stream frame may have a frame length and may include a data-burst section and a stuffing section. The data-burst section may have a payload section including a preamble section and a payload length, while the stuffing section may have a stuffing length. The process may also include zero stuffing the stuffing section in response to a particular format.

The bit-stream converter architecture may include a payload length detector and a zero stuffing unit in signal communication with the payload length detector. The zero stuffing unit is capable of zero stuffing the stuffing section responsive to the payload length detector detecting the payload length.

This invention also provides an inverse bit-stream converter for converting a first synchronous compressed bit-stream frame of data at a first sampling rate having zero stuffing to a second synchronous compressed bit-stream frame of data at a second sampling rate. The bit-stream converter may include a synchronization unit, a format detector in signal communication with the synchronization unit and a zero stuffing removal unit in signal communication with format detector. The format detector may be capable of determining a format for the first synchronous compressed bit-stream frame of data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
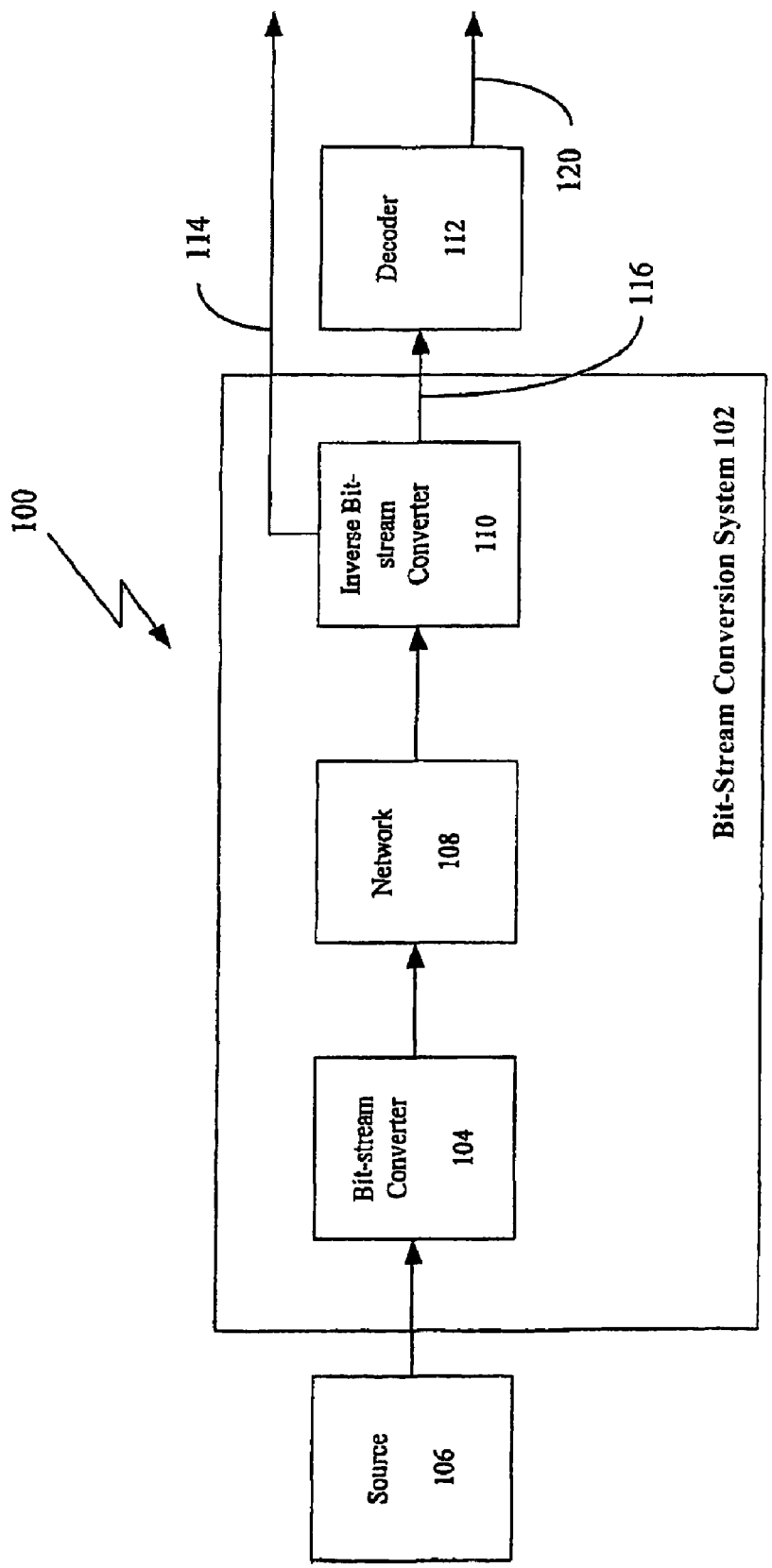
FIG. 1 is a block diagram illustrating an example implementation of bit-stream conversion system.

FIG. 1 shows a multimedia data communication system 100 including the bit-stream conversion system 102. The bit-stream conversion system 102 may include a bit-stream converter 104 in signal communication with a source 106 and a network 108. The inverse bit-stream converter 110 may be in signal communication with the network 108 (such as a multimedia network) and a decoder 112.

The source 106 may be a compact disk ("CD") or derivative product, a mini-disc or derivative product, a digital video disc or digital versatile disc ("DVD") or derivative product, or other equivalent type sources. The network 108 may be any link or network (wireless or physical link) that provides a clock (i.e. being clock master) that is different from the S/PDIF source.

The bit-stream conversion system 102 converts compressed bit-streams of data from the source 106 to match the network 108 sampling rate (also known as the transport rate) without altering the audio information in the bit-stream converter 104. The inverse bit-stream converter 110 then receives converted compressed bit-streams of data from the network 108 and determines the original sampling frequency $f_{sample}$ 114 and outputs new bit-stream of data 116 that is a reproduction of the bit-stream of data produced by the source 106. The new bit-stream of data 116 is input into the decoder 112 and the decoder 112 decodes the new bit-stream of data 116 producing separate pulse coded modulation ("PCM") channels that may be transmitted to a receiver via signal path 120.

Figure 2:
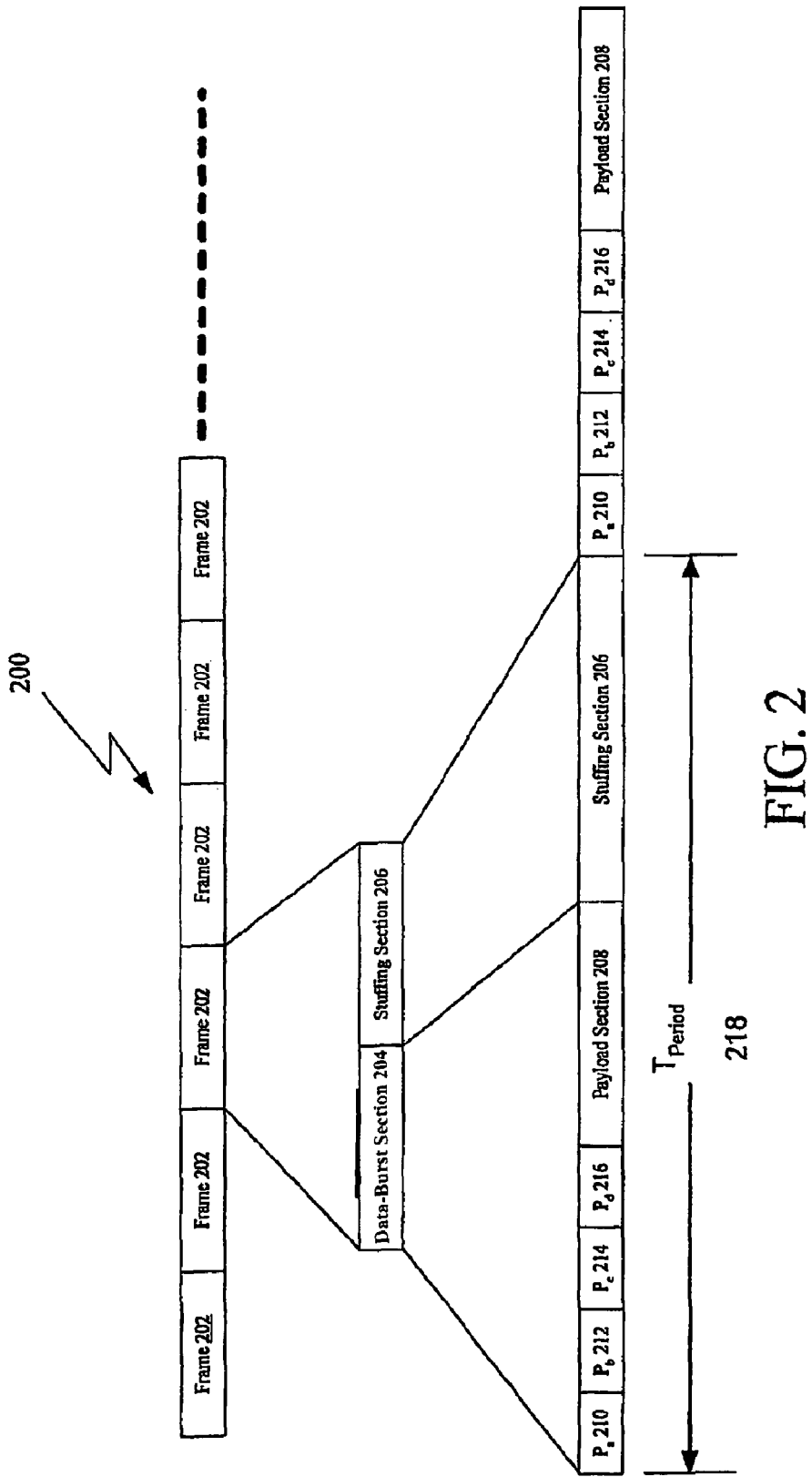
FIG. 2 is a block diagram illustrating an example format of a bit-stream.

FIG. 2 is a block diagram illustrating an example format of a bit-stream 200. The bit-stream 200 may include numerous frames 202. Each frame 202 may include sub-frames such as a data-burst section 204 and stuffing section 206. The data-burst section 204 may include a preamble and payload section 208. The preamble may include header information such as Pa 210, Pb 212, Pc 214 and Pd 216. Pa may equal 0xF872 and Pb may equal 0x4E1F. Both Pa and Pb represent a synchronization word that indicates the start of the data burst and may be utilized to obtain the sampling rate fsample. Pc represents the burst information and indicates the type of data in the bit-stream and some information and/or control for the receiver (not shown). Pd represents the length of the burst-payload in bits. The frame 202 has a period $T_{period}$ 218.

As an example, if the network 108 is designed to transmit CD audio signals, the network 108 may operate with a sampling frequency $f_{sample}$ of approximately 44.1 kHz and may be designed to transmit two channel linear PCM signals at 44.1 kHz. If the source 106 is a DVD, instead of a CD, the source 106 may transmit bit-streams of data that include multi-channel audio signals. These multi-channel audio signals may be compressed such that their transmission rate is lower than their equivalent 2-channel PCM version. In this methodology, multi-channel audio can be transmitted utilizing less than or equal to the same channel bandwidth of linear stereo PCM. As a result, the data length of the payload section of the DVD signal will be shorter than the equivalent data length of the payload section of a CD signal. Therefore, in order to maintain the same transmission signal period $T_{period}$ 218 between the DVD and CD signals, zero stuffing may be utilized to expand the length of the stuffing section 206 in order to compensate for the shorter payload section 208.

(1536 for Dolby Digital® AC-3). According to the compression rate, the actual data burst may be shorter (i.e., a high compression rate) or longer (i.e., a low compression rate). However, since there is no handshaking in S/PDIF, the process clocks out the data frame, which in this example is 1536×(64× sampling frequency) clock periods, before the next data burst is sent. Since the payload is lower than 1536× (64×$f_{sample}$), the rest is filled with zero bits ("zero stuffing").

By reducing and/or stretching the zero-stuffing, the burst-payloads may be transported at a different data rate without affecting the payload. In a typical Dolby Digital® bit-stream the sampling frequency is 48 kHz and the compression rate is 448 kbps. One compressed Dolby Digital® frame always represents 1536 samples. The original repetition rate between 2 data bursts is, therefore, 1536/48 kHz=32 ms. If the network is operating at 44.1 kHz, the repetition rate equivalently needs to be reduced to 1411.2 in order not to lose any information (1411.2/44.1 kHz=32 ms). Consequently, the amount of zero-stuffing should be reduced by 124.8 IEC 60958/61937 frames. Because 1411.2 is a rational number, the goal is to reduce the stuffing of 4 consecutive burst-payloads by 125 frames (1411) and the $5^{th}$ burst-payload by 124 IEC 60958/61937 frames (1412), such that the average data rate of 1411.2 is respected.

In this example, the original frame repetition rate is 32 ms (burst-payload and stuffing). However, for a network clock (e.g. 44.1 kHz) that is lower than the source clock (e.g. 48 kHz), less bits need to be transported before starting the next frame. Therefore, the amount of zeros should be reduced because it does not affect the payload. The amount of reduction is represented by the relation of 48/44.1. Because this relation is not an integer, an approach is applied that is similar to a leap-year correction. Here, every fifth frame is slightly longer so that the average frame rate remains 32 ms. If the source is at a lower $f_{sample}$ (say 32 kHz) than the network, then the amount of zeros has to be increased (stretched) correspondingly.

For other formats, the compression may be relatively low. For example, the DTS format has 6 IEC 60958/61937 zero-frames available between 2 burst-payloads. This is less than required for bit-stream conversion from 48 kHz to 44.1 kHz. Therefore, in this example, a $2^{nd}$ stereo transport channel may be utilized to transport all information at 44.1 kHz (assume DTS 48 kHz, bit-rate=1509.75 kbps). The following table summarizes some typical examples:

| Format | Preamble Pc | IEC 61937 Repetition Period Frames (bytes) | Bit-rate (kbps)/ Payload (bytes) | Network Repetiton Period for 44.1 kHz |
|---|---|---|---|---|
| AC-3 (48 kHz) | 1 | 1536 (6144) | (32–640)/ (128–2560) | 1411.2 (4x1411 + 1x1412) |
| MP3 (32 kHz) | 5 | 1152 (4608) |  | 1587.6 (4x1588 + 1x1586) |
| MP3 (44.1 kHz) | 5 | 1152 (4608) |  | 1152 |
| MP3 (48 kHz) | 5 | 1152 (4608) |  | 1058.4 (4x1058 + 1x1060) |
| AAC (48 kHz) | 7 | 1024 (4096) |  | 940.8 (4x941 + 1x940 |
| DTS I (48 kHz) | 11 | 512 (2048) | 754.50/1006 | 470.4 (4x470 + 1x472) |
| DTS II (44.1 kHz) | 12 | 1024 (4096) | 1234.00/4096 | 1024 |
| DTS I (48 kHz) | 11 | 512 (2048) | 1509.75/2013 | 470.4 (4x470 + 1x472) |
| DTS III (24/96) | 13 | 2048 (8192) |  | 940.8 (4x941 + 1x940) |

Figure 3:
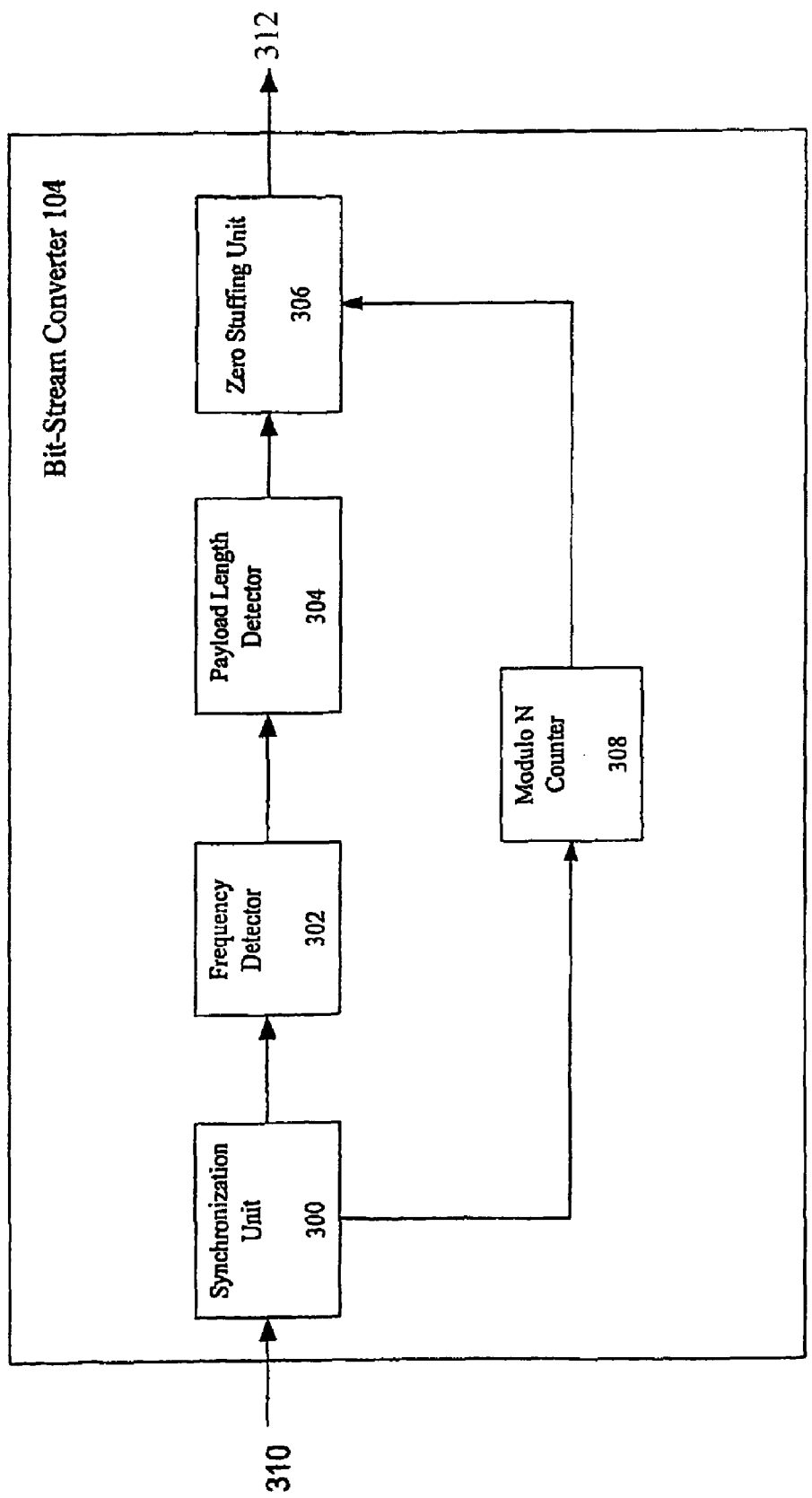
FIG. 3 is a block diagram illustrating an example implementation of the bit-stream converter element of FIG. 1.

For example, IEC 61937 specifies how non-linear PCM (compressed audio) is transferred over S/PDIF. S/PDIF is a unidirectional bi-phased coded link and there is no handshake between source 106 and the destination. The compressed audio frame always represents a constant number of samples, FIG. 3 is a block diagram illustrating an example implementation of the bit-stream converter 104. The bit-stream converter 104 may include a synchronization unit 300, a frequency detector 302, a payload length detector 304, a zero stuffing unit 306 and a counter 308. The synchronization unit 300 is in signal communication with the source 106 via a signal path 310. The synchronization unit 300 is also in signal communication with frequency detector 302 and counter 308. Frequency detector 302 is in signal communication with both the synchronization unit 300 and the payload length detector 304. The zero stuffing unit 306 is in signal communication with the payload length detector 304, the counter 308 and the network 108 via signal path 312. The counter 308 may be a modulo-N counter (in this case N=5).

In operation, the synchronization unit 300 (also known as "SYNC") identifies the preamble Pa, Pb, Pc and Pd of a new burst-payload. The SYNC compares the bit-stream to the preamble Pa and Pb, and if a match is found, the SYNC triggers the modulo-N (here N=5) counter for correct zero stuffing modification at the zero stuffing unit 306. Pc may act to identify the type of encoding. The SYNC reads the Pc, the frequency detector 302 detects the sampling frequency and the length of the payload is determined by the payload length detector (from reading Pd) in order to modify the zero stuffing by the zero stuffing unit 306. This methodology also may determine how many network channels need to be allocated in parallel.

Figure 4:
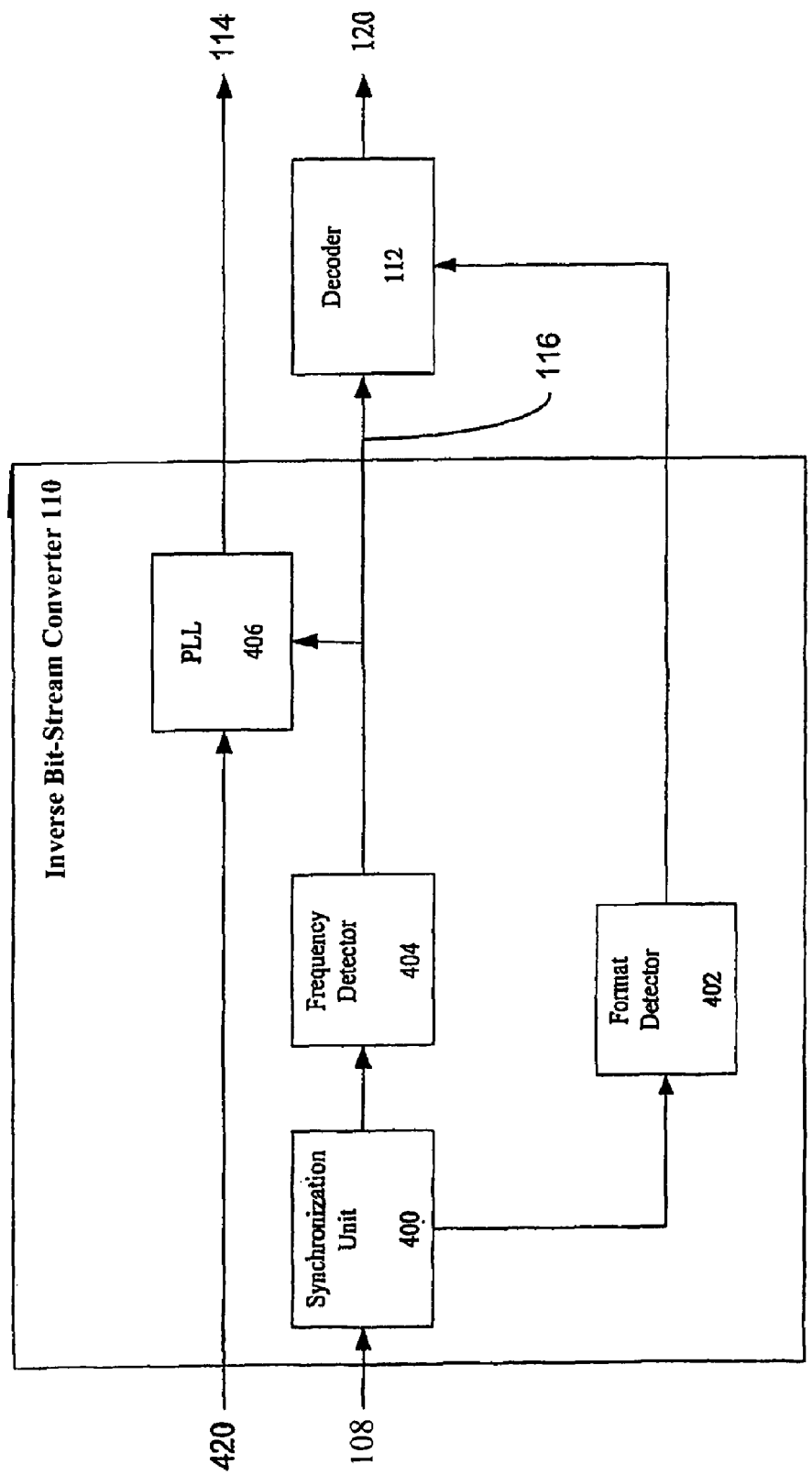
FIG. 4 is a block diagram illustrating an example implementation of the inverse bit-stream converter element of FIG. 1.

FIG. 4 is a block diagram illustrating an example implementation of the inverse bit-stream converter 110. The inverse bit-stream converter 110 may include a synchronization unit 400, a format detector 402, a frequency detector 404 and a phase lock loop ("PLL") 406. The synchronization unit 400 is in signal communication with the network 108, the format detector 402 and the frequency detector 404. The frequency detector 404 is in signal communication with the PLL 406 and the decoder 112.

In operation, the inverse bit-stream converter 110 extracts the original bit-stream information and triggers the PLL 406 to generate synchronously the original sampling frequency 114. For example, if the network clock 420 is operating at 44.1 kHz but the frequency detector 404 detects that the original bit-stream is at 48 kHz, the PLL 406 is driven by the network clock 420 and the frequency detector 404 to recover the 48 kHz required by the decoder 112. The decoder 112 uses the parameters from 402 and 404 to properly decode the audio in order to produce and output a signal via signal path 120.

A controller (not shown) may be utilized to control the operation of the bit-stream converter 104 and inverse bit-stream converter 110. The controller may be any type of control device that may be selectively implemented in software, hardware (such as a computer, processor, micro controller or the equivalent), or a combination of hardware and software. The controller may utilize optional software (not shown).

The software, includes an ordered listing of executable instructions for implementing logical functions, may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, or device. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), a Magnetic Random Access Memory ("MRAM"), a Ferro Random Access Memory ("FRAM"), a chalcogenide memory or Ovonic Universal Memory ("OUM"), a polymer memory, a MicroElectroMechanical (MEMS") memory and a write once 3D memory, an optical fiber (optical), and a portable compact disc read-only memory "CD ROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
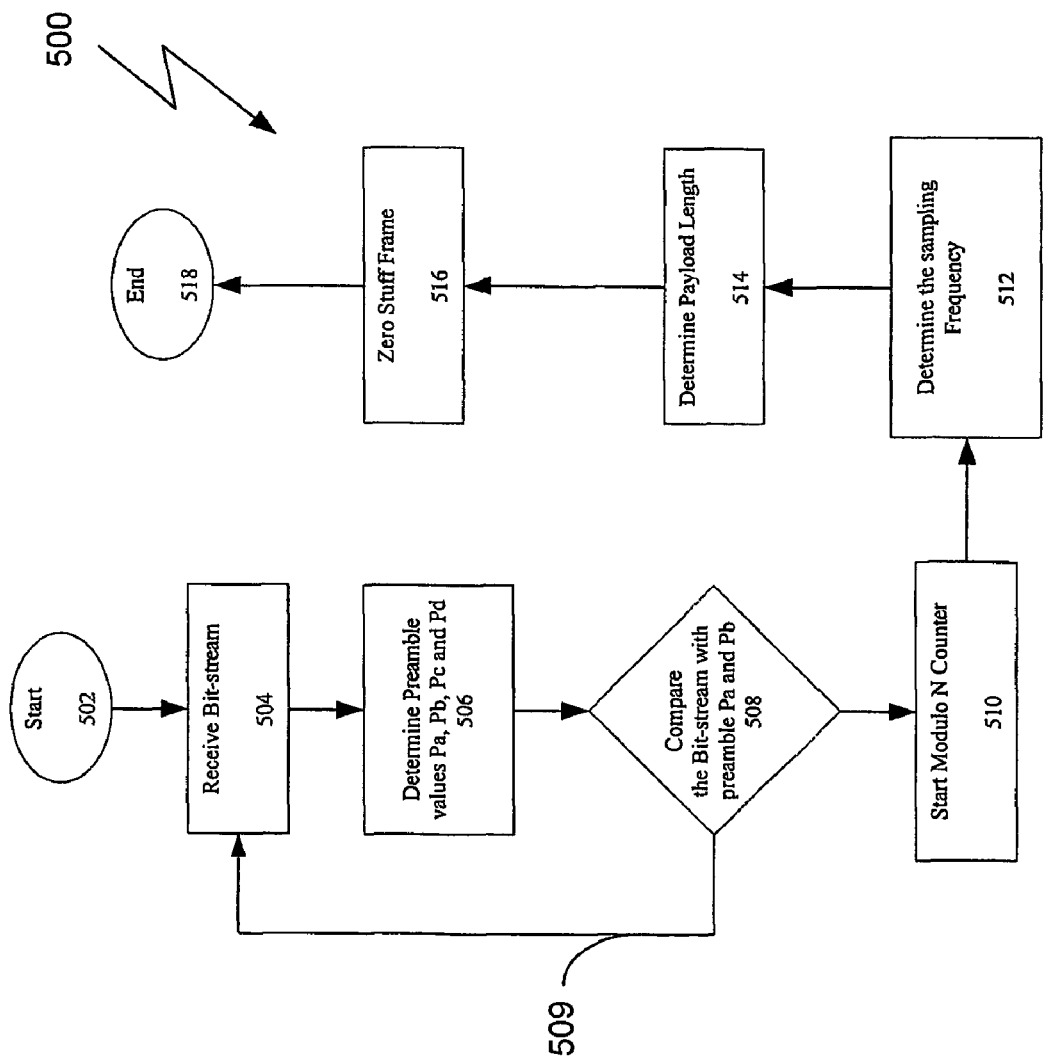
FIG. 5 is a flowchart illustrating an example process preformed by the bit-stream converter of FIG. 3.

FIG. 5 is a flowchart 500 illustrating an example process performed by the bit-stream converter 104. This process may be performed by hardware, software or combination of both. The process starts 502 with the input reception 504 of information such as a bit-stream of data by bit-stream converter 104. The synchronization unit 300 determines the preamble values Pa, Pb, Pc and Pd 506. In decision 508, a comparator unit (not shown) within the synchronization unit 300 compares the bit-stream to the preamble parameters Pa and Pb 508. If the result in the decision 508 is not an approximate match between the bit-stream and preamble values Pa and Pb, the process returns 509 to step 504 and repeats.

If instead the result of decision 508 is an approximate match between the bit-stream and preamble values Pa and Pb, the counter is started 510 and the sampling frequency of the bit-stream is determined 512. Next, the payload length detector 304 determines the payload length 514. Next, the zero stuffing unit stuffs the stuffing section with the appropriate number of zeros 516 and the process ends at step 518.

Figure 6:
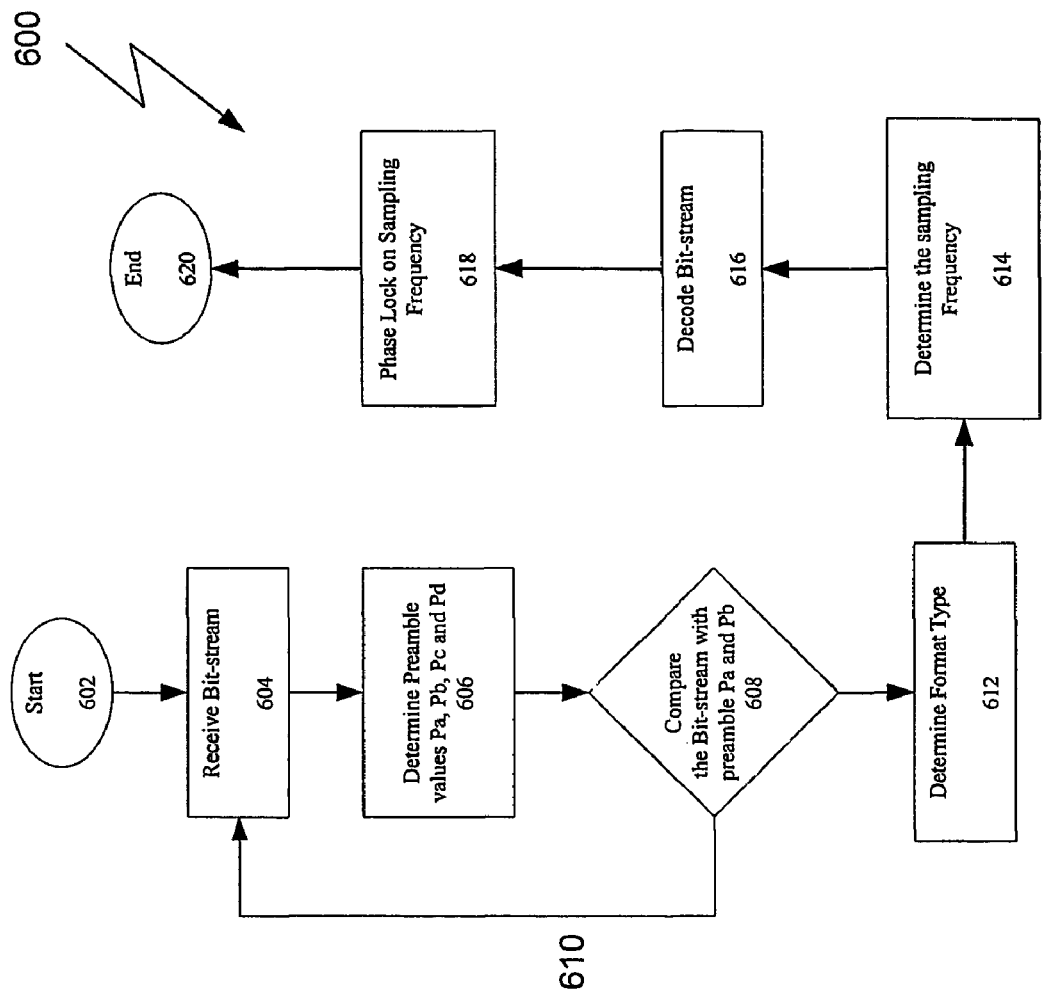
FIG. 6 is a flowchart illustrating an example process preformed by the inverse bit-stream converter of FIG. 4.

FIG. 6 is a flowchart 600 illustrating an example process performed by the inverse bit-stream converter 110. The example process may be performed by hardware, software or combination of both. The process starts at step 602 with the input and reception of the bit-stream data 604 by the inverse bit-stream converter 110. The synchronization unit 400 determines the preamble values Pa, Pb, Pc and Pd 606. In decision 608, a comparator unit (not shown) within the synchronization unit 400 compares the bit-stream to the preamble parameters Pa and Pb. If the result in decision step 608 is not an approximate match between the bit-stream and preamble values Pa and Pb, the process returns 610 to step 604 and repeats.

If instead the result of decision 608 is an approximate match between the bit-stream and preamble values Pa and Pb, the format detector determines the format type Pc of the bit-stream 612. The frequency detector then determines the original sampling frequency of the compressed audio 614. Next, the decoder 112 decodes the bit-stream 616 and produces an output signal that is transmitted to a receiver, e.g. a digital to analog converter (not shown). The PLL locks on to the sampling frequency of the bit-stream 618 and produces the original frequency rate 114 of the original bit-stream. The process then ends in step 620.

While various embodiments of the invention have been described, it will be apparent to those of ordinary skill in the art that many more embodiments and implementations are possible that are within the scope of this invention.

What is claimed is:

1. A method for converting a first synchronous compressed bit-stream frame of data at a first sampling rate to a second synchronous compressed bit-stream frame of data at a second sampling rate, the method comprising:

receiving the first synchronous compressed bit-stream frame of data;
determining a format for the first compressed bit-stream frame where the first compressed bit-stream frame has a frame length and the first compressed bit-stream frame includes a data-burst section having a preamble section and a payload section having a payload length and a stuffing section having a stuffing length, where the preamble section includes a synchronization word, and where determining the format includes
comparing the synchronization word to a predefined value to determine if a match is found;
starting a counter in response to the synchronization word comparison;
determining the first sampling rate;
zero stuffing the stuffing section responsive to determining the format to convert the first synchronous compressed bit-stream frame of data to the second synchronous compressed bit-stream frame of data; and
transmitting the second synchronous compressed bit-stream frame of data at the second sampling rate.

2. The method of claim 1, wherein zero stuffing includes zero stuffing the stuffing section responsive to the payload length.

3. The method of claim 2, wherein the stuffing length is equal to the frame length minus the payload length.

4. A method for converting a first synchronous compressed bit-stream frame of data at a first sampling rate having zero stuffing to a second synchronous compressed bit-stream frame of data at a second sampling rate, the method comprising:
receiving the first synchronous compressed bit-stream frame of data;
determining a format for the first compressed bit-stream frame where the first compressed bit-stream frame has a frame length and the first compressed bit-stream frame includes a data-burst section having a preamble section and a payload section having a payload length and a stuffing section having a stuffing length, where the preamble section includes a synchronization word, and where determining the format includes
comparing the synchronization word to a predefined value to determine if a match is found;
removing zero stuffing from the stuffing section responsive to determining the format to convert the first synchronous compressed bit-stream frame of data to the second synchronous compressed bit-stream frame of data; and
transmitting the second synchronous compressed bit-stream frame of data at the second sampling rate.

5. The method of claim 4, wherein removing includes removing the zero stuffing from the stuffing section responsive to the payload length.

6. The method of claim 5, wherein the stuffing length is equal to the frame length minus the payload length.

7. A bit-stream converter for converting a first synchronous compressed bit-stream frame of data at a first sampling rate to a second synchronous compressed bit-stream frame of data at a second sampling rate, the bit-stream converter comprising:
a synchronization unit;
a payload length detector;
a frequency detector in signal communication with the synchronization unit and payload length detector;
a zero stuffing unit in signal communication with the payload length detector, the zero stuffing unit capable of zero stuffing the stuffing section responsive to the payload length detector detecting the payload length to convert the first synchronous compressed bit-stream frame of data to the second synchronous compressed bit-stream frame of data;
a counter in signal communication with the synchronization unit and the zero stuffing unit; and
an output for transmitting the second synchronous compressed bit-stream frame of data at the second sampling rate.

8. An inverse bit-stream converter for converting a first synchronous compressed bit-stream frame of data at a first sampling rate having zero stuffing to a second synchronous compressed bit-stream frame of data at a second sampling rate, the bit-stream converter comprising:
a synchronization unit;
a format detector in signal communication with the synchronization unit, the format detector capable of determining a format for the first synchronous compressed bit-stream frame of data;
a zero stuffing removal unit in signal communication with format detector to convert the first synchronous compressed bit-stream frame of data to the second synchronous compressed bit-stream frame of data; and
an output for transmitting the second synchronous compressed bit-stream frame of data at the second sampling rate.

9. A bit-stream converter for converting a first synchronous compressed bit-stream frame of data at a first sampling rate to a second synchronous compressed bit-stream frame of data at a second sampling rate, the bit-stream converter comprising:
means for determining a payload length;
means for synchronization;
a frequency detector in signal communication with the synchronization means and the determining means;
means for zero stuffing a sniffing section responsive to determining the payload length to convert the first synchronous compressed bit-stream frame of data to the second synchronous compressed bit-stream frame of data;
a counter in signal communication with the synchronization means and the zero stuffing means; and
an output for transmitting the second synchronous compressed bit-stream frame of data at the second sampling rate.

10. An inverse bit-stream converter for converting a first synchronous compressed bit-stream frame of data at a first sampling rate having zero stuffing to a second synchronous compressed bit-stream frame of data at a second sampling rate, the bit-stream converter comprising:
means for synchronization;
means for determining a format for the first synchronous compressed bit-stream frame of data;
means for removing the zero stuffing to convert the first synchronous compressed bit-stream frame of data to the second synchronous compressed bit-stream frame of data; and
means for transmitting the second synchronous compressed bit-stream frame of data at the second sampling rate.

11. A non-transitory computer readable medium having a plurality of instructions for converting a first synchronous compressed bit-stream frame of data at a first sampling rate to a second synchronous compressed bit-stream frame of data at a second sampling rate, the plurality of instructions comprising:
instructions for receiving the first synchronous compressed bit-stream frame of data;

instructions for determining a format for the first compressed bit-stream frame where the first compressed bit-stream frame has a frame length and the first compressed bit-stream frame includes a data-burst section having a preamble section and a payload section having a payload length and a stuffing section having a stuffing length, where the preamble section includes a synchronization word, and where determining the format includes comparing the synchronization word to a predefined value to determine if a match is found;

instructions for starting a counter in response to the synchronization word comparison;

instructions for determining the first sampling rate;

instructions for zero stuffing the stuffing section responsive to determining the format to convert the first synchronous compressed bit-stream frame of data to the second synchronous compressed bit-stream frame of data; and instructions for transmitting the second synchronous compressed bit-stream frame of data at the second sampling rate.

12. The computer readable medium of claim 11, wherein the instructions for zero stuffing include instructions for zero stuffing the stuffing section responsive to the payload length.

13. The computer readable of claim 12, wherein the stuffing length is equal to the frame length minus the payload length.

14. A non-transitory computer readable medium having a plurality of instructions for converting a first synchronous compressed bit-stream frame of data at a first sampling rate having zero stuffing to a second synchronous compressed bit-stream frame of data at a second sampling rate, the plurality of instructions comprising:

instructions for receiving the first synchronous compressed bit-stream frame of data;

instructions for determining a format for the first compressed bit-stream frame where the first compressed bit-stream frame has a frame length and the first compressed bit-stream frame includes a data-burst section having a preamble section and a payload section having a payload length, and a stuffing section having a stuffing length, where the preamble section includes a synchronization word, and where determining the format includes comparing the synchronization word to a predefined value to determine if a match is found;

instructions for removing zero stuffing from the stuffing section responsive to determining the format to convert the first synchronous compressed bit-stream frame of data to the second synchronous compressed bit-stream frame of data; and instructions for transmitting the second Synchronous compressed bit-stream frame of data at the second sampling rate.

15. The computer readable medium of claim 14, wherein the instructions for removing zero stuffing include instructions for removing the zero stuffing from the stuffing section responsive to the payload length.

16. The computer readable medium of claim 15, wherein the stuffing length is equal to the frame length minus the payload length.

* * * * *